Figure 1:
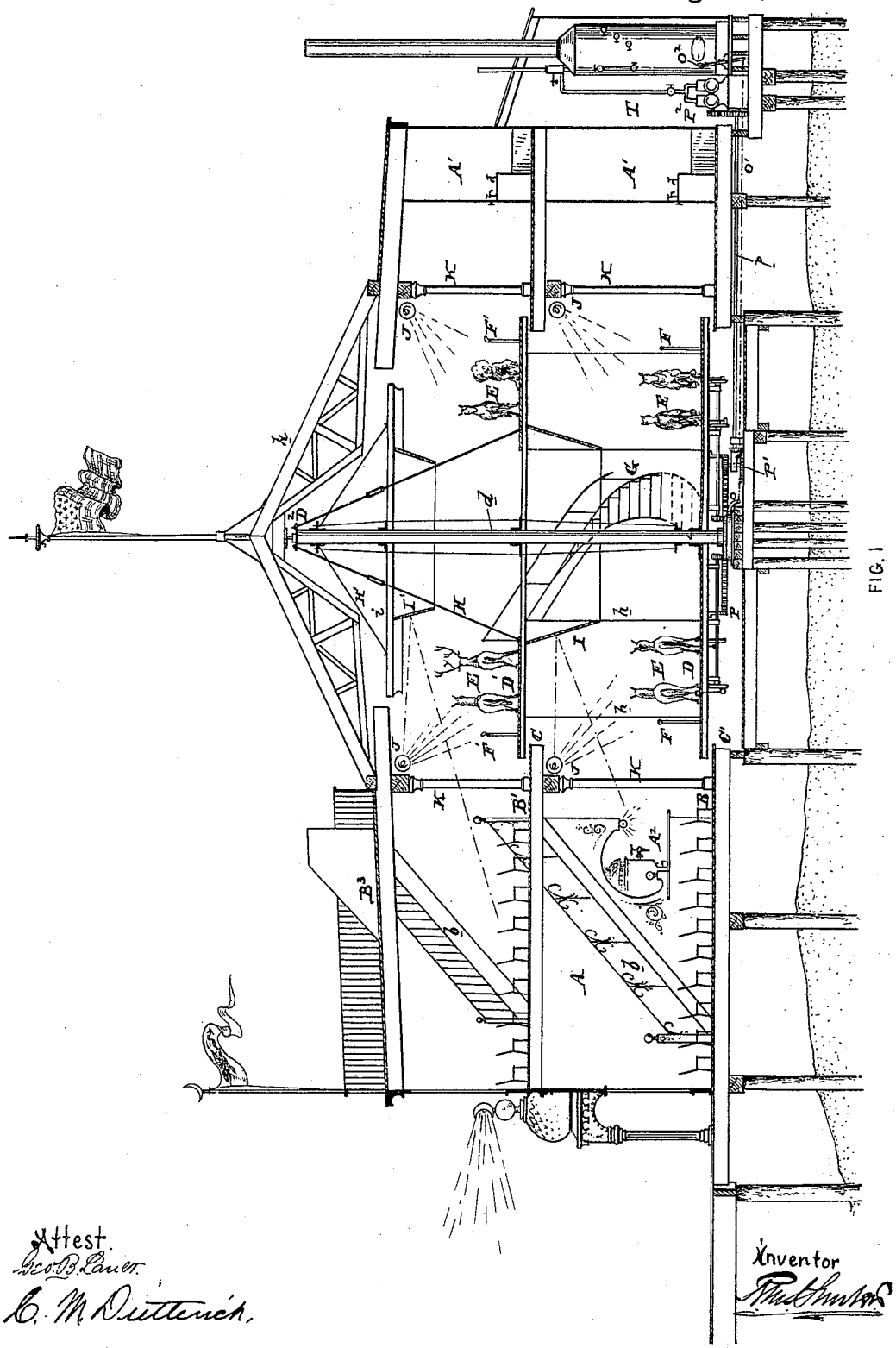

(No Model.)

3 Sheets—Sheet 1.

R. M. HUNTER.
CAROUSEL.

No. 589,390.

Patented Aug. 31, 1897.

Attest.
Geo. B. Lauer.
C. M. Dutterich.

Inventor
R. M. Hunter (No Model.) 3 Sheets—Sheet 3.

R. M. HUNTER.
CAROUSEL.

No. 589,390. Patented Aug. 31, 1897.

Attest
Geo. B. Lauer.
C. M. Dietterich.

Inventor
R. M. Hunter

THE NORRIS PETERS CO., PHOTO-LITHO., WASHINGTON, D. C.

UNITED STATES PATENT OFFICE.

RUDOLPH M. HUNTER, OF PHILADELPHIA, PENNSYLVANIA.

CAROUSEL.

SPECIFICATION forming part of Letters Patent No. 589,390, dated August 31, 1897.

Application filed July 15, 1892. Serial No. 440,111. (No model.)

*To all whom it may concern:*

Be it known that I, RUDOLPH M. HUNTER, of the city and county of Philadelphia and State of Pennsylvania, have invented an Improvement in Carousels, of which the following is a specification.

My invention has reference to carousels; and it consists of certain improvements which are fully set forth in the following specification and shown in the accompanying drawings, which form a part thereof.

This application (Case No. 223) involves a number of improvements in what are known as "carousels" or "merry-go-rounds," all of which improvements are adapted to be used conjointly. In the preferred construction of my improvements I arrange a building having at least two floors with an opening in the upper floor and a centrally-located carousel pivoted within the building and extending from the lower floor to the upper floor through the said opening. The carousel may have two circular platforms, one arranged substantially on the level of each floor, and each of these platforms may be provided with suitable supports for the riders, part of which may be in the form of animals or any of the well-known devices. The animals may be stationary or movable, and if movable are preferably operated from the mechanism located close to the pivot or axis of the carousel, so as to overcome all needless friction, and at the same time permit a slow movement of the animals with a rapid movement of the platforms. The slow-moving carousels are undesirable and have never been successful in practice. Furthermore, all carousels employing moving animals heretofore constructed have been slow-moving, as the speed of revolution was governed by the capacity of the animal to move. The mechanism employed for imparting such movement have been wheels running upon a railway below the platform and provided with operating crank-bars. Such devices were cumbersome, slow in movement, made a very great noise, jarred upon the system of the riders, and required great power to move them. All of these objectionable features are eliminated by my improvements. I am enabled to obtain any desired speed in the revolution of the carousel-platforms and have the animals move at any slow speed desired, so as not to be dangerous or uncomfortable to the riders. When I employ double platforms, I prefer to arrange a stairway leading from one platform to the other, so that the riders may pass from one platform to the other while the carousel is in motion or prior to taking their places upon the particular platform desired. The audience may occupy the two floors.

In connection with the apparatus I may employ a suitable device which will permit the carousel being put into motion without any of the animals being made to move independently of the platform, and after the momentum has been obtained and the inertia of the carousel overcome the device may be operated to start the animals in motion, and thereby overcome the necessity of employing a larger power than would be necessary to keep the carousel with moving animals into operation after being started. Furthermore, it is evident that, if desired, the moving animals may be thrown out of operation and maintained out of operation for an indefinite period.

I also prefer to employ in connection with my improvements suitable lights and reflectors with moving screens of glass having different colors and operated, preferably, automatically, so as to constantly vary the color effects upon the carousel and its occupants. In the most approved construction of this portion of my invention I cause different-colored lights to simultaneously illuminate different portions of the carousel and also the audience-room by reflection.

My improvements will be better understood by reference to the accompanying drawings, in which—

Figure 2:
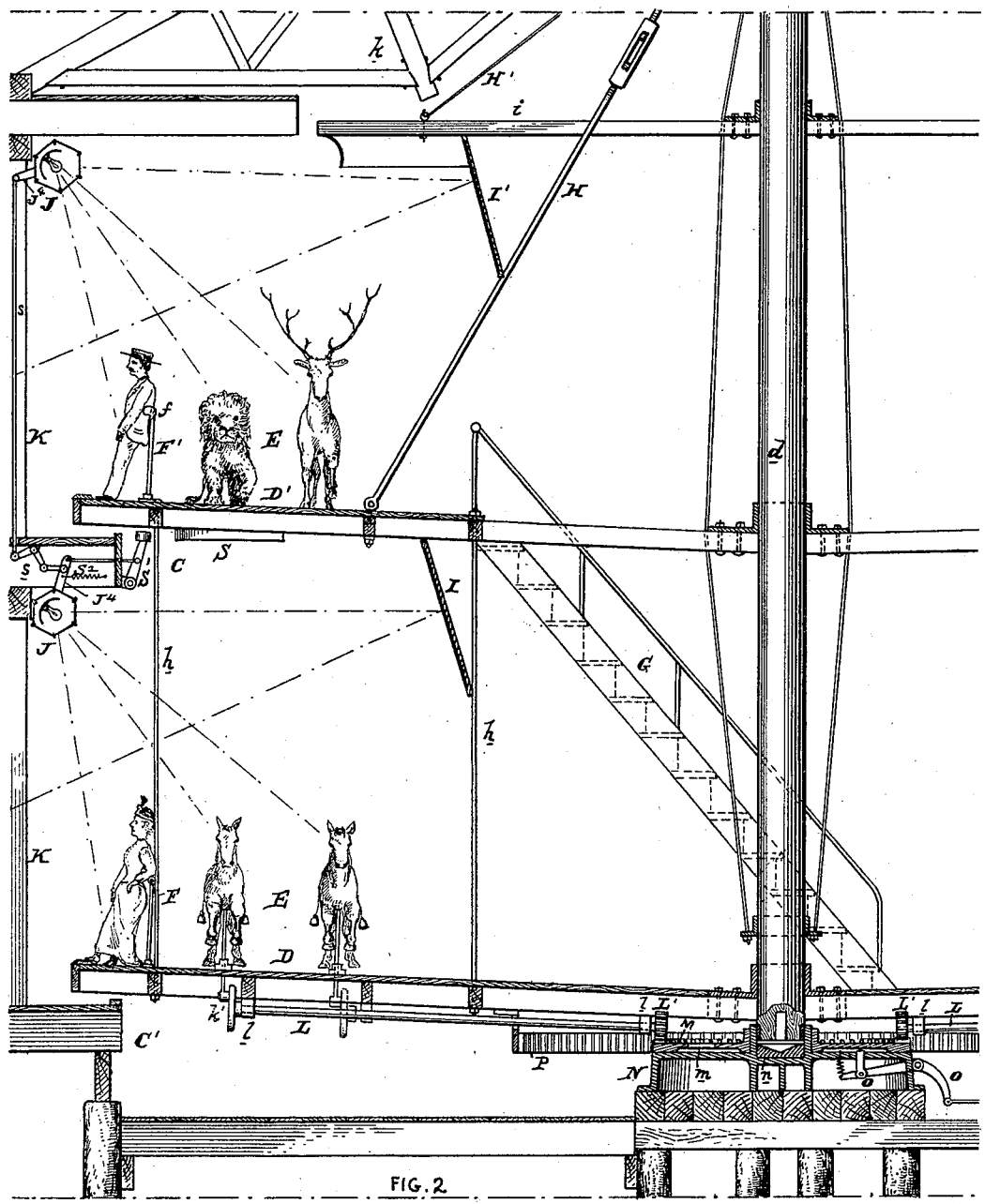
Figure 3:
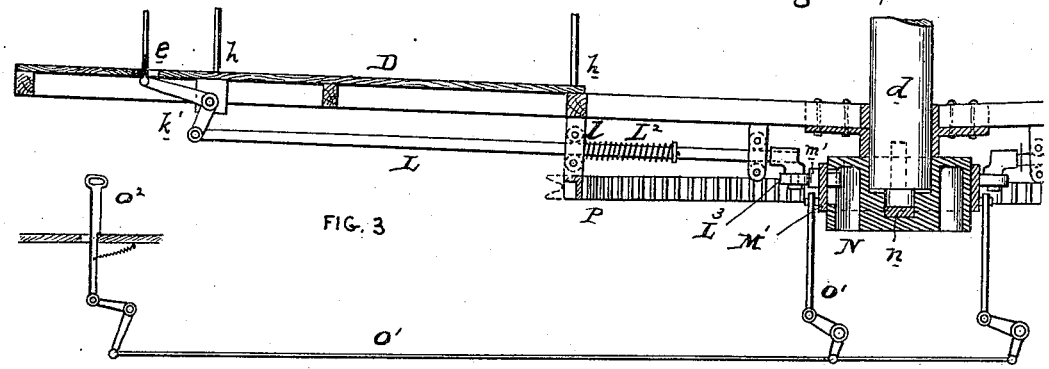
Figures 4, 5:
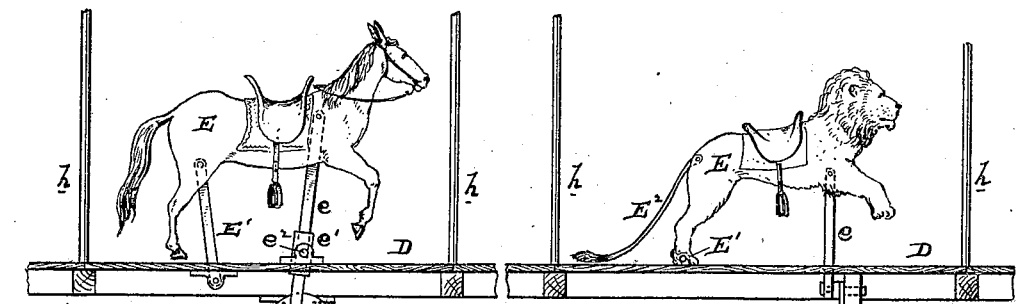
Figures 6, 7:
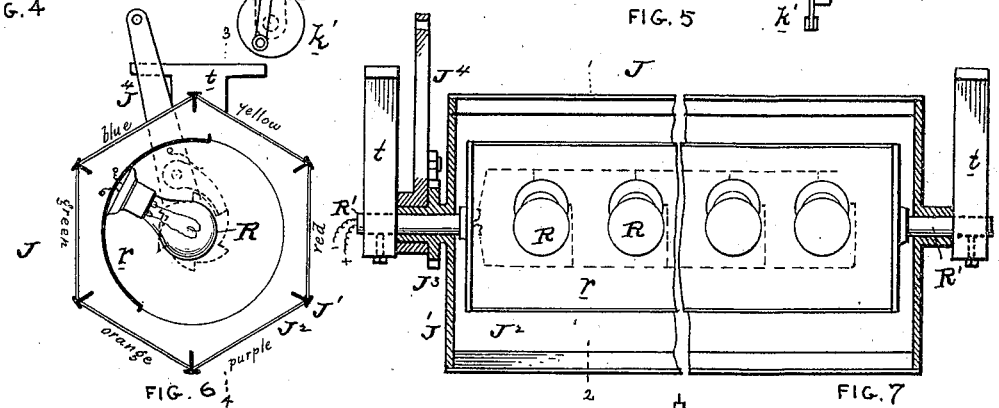
Figure 8:
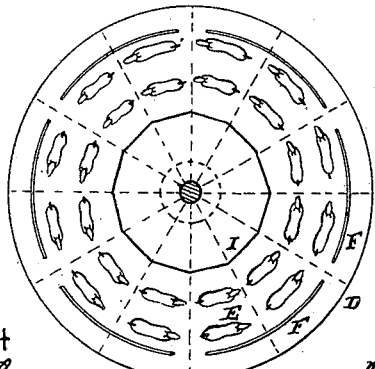
Figures 9, 10:
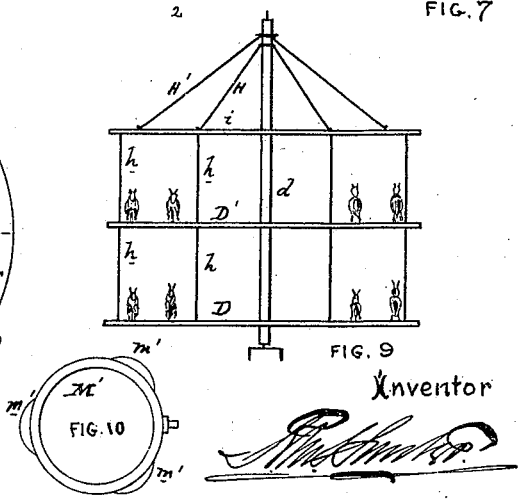

Figure 1 is a sectional side elevation of a carousel embodying my improvements. Fig. 2 is an enlarged view of a portion of same. Fig. 3 is a view corresponding to the lower portion of Fig. 2, showing a modified construction of apparatus for operating the moving animals. Figs. 4 and 5 are elevations showing two methods of supporting the animals so that they may be permitted to move. Fig. 6 is a cross-section of Fig. 7 on line 1 2 of Fig. 7, showing the varied-colored light-reflector. Fig. 7 is a sectional elevation of same on line 3 4 of Fig. 6. Fig. 8 is a plan view of the lower platform of the carousel, showing the disposition of the animals and other parts. Fig. 9 is an elevation of a double carousel, showing a modification of the method of bracing the same. Fig. 10 is a plan view of the cam employed in the construction shown in Fig. 3. Fig. 11 is a perspective view of one of the parts shown on the upper carousel-platform against which the riders may lean, and Fig. 12 is a plan view of the cam mechanism for automatically operating the varied-colored lights.

A is the main building or structure for forming the framework for the carousel-support. This structure is provided with a lower floor B and an upper floor B', and its extreme roof may be formed as an observatory $B^3$, overlooking the sea or country. The central portion of the floor B is preferably cut away in the shape of a circle C' to form a space or well under the lower carousel-platform D. The upper floor B' has a circular or other aperture C cut out of it to permit the passage of the suspension-rod $h$ between the upper and lower platforms of the carousel. The upper part of the roof is also cut away and is surmounted by a suitable truss-roofing $k$.

$d$ is the central post or axis of the carousel and is pivoted at $D^2$ to the roof structure $k$ and stepped at $n$ in the base-plate N. Radiating from these posts are the timbers upon which the platforms D and D' are built. These platforms are circular or polygonal in plan. The radiating timbers of the platform D' may be supported by ties H of considerable strength and connecting with the said timbers preferably between the animals and the central post, as shown. The lower platform and its timbers are hung from the timbers of the upper platform by suspension or tie rods $h$. The lower platform D is therefore in effect suspended and is carried around by the upper platform.

Broadly considered, it is evident that my invention is not limited to the particular supports for the riders, which may be suspended from the upper carousel-platform, for in place of the platform D any other suitable support or supports for the riders may be hung to the ties $h$. The two platforms may be connected by a stairway G, of any suitable construction. In Fig. 1 this stairway is shown as circular. In Fig. 2 the circular arrangement is indicated by dotted lines, while the solid lines indicate a straight stairway arranged close to one side of the post $d$. It is immaterial to my invention what form of stairway or means of communication may be employed.

$i$ are the radiating timbers, acting as a support for a roof over the upper platform, which is adapted to hide the truss structure of the upper roof $k$ of the building. These timbers $i$ may be supported by ties H' from the central post D, and also by suitable brackets at their inner ends. The upper carousel is provided with mirrors I', and the lower carousels with mirrors I, the object of which is to reflect the rays of light from the varied-colored reflectors J back upon the audience, and also, if desired, upon the riders on the carousel. As the carousel revolves the mirrors cause the lights to be shot or projected in all directions, producing a most beautiful effect, particularly in view of the fact that the colors are constantly changing. The varied-colored reflectors J will be fully described later on.

The animals E are arranged upon the platforms, preferably at some distance from the extreme edge, and outside of them is arranged either a series of curved supports F, as shown in the lower part of Fig. 2 and in Fig. 8, or a series of uprights F', having suitable rests $f$, as shown in the upper part of Fig. 2 and in Fig. 11. Either one or other, or both, of these may be used in the same carousel. This provides means for the large number of riders who do not desire to mount the animals, and at the same time prevent them from interfering with those who do desire to use the animals. The platforms D and D' extend over and close to the floors B and B', as shown clearly in Fig. 2, so as to prevent any possibility of accidents, also to insure, in case of breakage of any of the ties, the proper support of the platforms at their outer extremities to prevent any accident. When employing moving animals, I may support them in any suitable manner, the two methods of support being shown in Figs. 4 and 5.

In Fig. 4 we have the animal E pivoted upon a bar E' at the rear and upon a bar $e$ at the forward part. The bar $e$ slides up and down through a box $e'$, pivoted upon a transverse axis $e^2$. The bar $e$ is operated by a crank $k'$ upon the end of a shaft L, Fig. 2, carried in bearings $l$ and provided upon its inner end with a pinion L', meshing with a stationary gear M, resting upon the pedestal N. As the crank $k'$ revolves the desired movements are given to the animal, and when constructed as illustrated the said movements will be most natural to a galloping horse, causing the forward movement, as well as the up-and-down movement, at the head and rear portions. As the carousel moves at a rapid rate the galloping action is always with a feeling corresponding to a forward movement.

In Fig. 5 the animal E is pivoted directly at E' with the platform, and the tail $E^2$ in this instance is also pivoted. The forward part of the animal is pivoted to the bar $e$, which is operated by a bell-crank $k'$, which is another form of the crank shown in the other figure. In this case the crank is reciprocated by the mechanism shown in Fig. 3, to be described later on. It is evident, however, that the crank shown in Fig. 4 may be employed with the method of pivoting the animal shown in Fig. 5.

Referring again to Fig. 2, we have the gear

M loosely supported and adapted either to be carried around with the carousel or to be locked in a stationary position. It is centered about the axis of the carousel and is provided with a slot $m$, in which a clutch O is adapted to be thrown when it is desired to arrest the gear for the purpose of operating the pinions L' and by them the animals. The clutch O is operated by a rod O' and lever mechanism $O^2$. (Shown in Fig. 1.) The clutch is thrown into the position shown in Fig. 2, and the carousel started up by operating the engine $P^2$ in the power-house T, which engine, through the shaft $p$ and gearing P', operates the internal gear P, secured to the under part of the lower platform or otherwise connected to the central post $d$. After motion has been imparted and the inertia overcome the lever $O^2$ may be thrown, permitting the spring-clutch O to press upward until it enters the slot $m$. The gear M is then arrested and motion is at once given to the animals. Any suitable form of clutch mechanism desired may be employed—such, for instance, as the well-known brake-band around the outside of the wheel—which would have the effect of slowly starting the animals.

The varied-colored reflectors J shown in the various figures have a construction which is clearly shown in Figs. 2, 6, and 7. A series of electric lamps R are arranged within the reflector $r$, which is provided with supports R', secured in brackets $t$, which in turn are fastened to the structure of the building, so as to place the reflectors and lamps in positions shown in Figs. 1 and 2 with respect to the revolving platforms. Encircling the lamps and reflector is a frame J', which has a series of different-colored glass or other transparent plates $J^2$, the colors of which are indicated in Fig. 6. This frame is journaled upon the supports R' and is provided with a ratchet-wheel $J^3$, which is operated by a pawl-lever $J^4$. As the lever $J^4$ is reciprocated the frame J is caused to make a portion of a revolution, so as to bring different-colored glasses into operative position with each movement. These levers $J^4$ of the reflectors of the two floors are connected by links and cranks $s$, as shown in Fig. 2, so that when one is moved the other is moved also. This mechanism may be operated automatically by means of a pivoted lever S' and spring $S^2$, the lever S' being moved back by a cam S on the under end part of the upper platform. The spring $S^2$ brings the supports into operative position for the cam on the next revolution. Assuming that the colored glasses are as indicated in Fig. 6, we will have a red beam of light thrown upon the mirrors I I' and reflected back upon the audience. We will also have a downward-projecting purple beam of light thrown upon the riders of the carousel, and we will also have still further, if desired, an orange-colored beam projected obliquely backward across the red beam. These beams will be constantly changed, producing the most beautiful effects and illuminating the riders and carousel-platforms and animals differently with every one or more revolutions. It is evident that a more rapid movement could be obtained by employing more of the cams S, in which case the colors would vary more rapidly than once in every revolution. In Fig. 1 I have shown four of these reflectors, but in ordinary practice two would be sufficient, as the audience is usually located mainly to one side of the carousel-platforms. Any other means may be employed for projecting different-colored lights upon the riders, and other automatic devices may be employed for automatically changing the said colored lights. In place of supporting the platforms by the heavy oblique ties H, as shown in Figs. 1 and 2, the timbers $i$ may be made heavy and project farther, the ties $h$ may extend up to said timbers $i$, and the braces H and H' may be arranged as indicated in Fig. 9, though I prefer the construction shown in Figs. 1 and 2, as being lighter and more ornamental.

Referring to the construction shown in Fig. 3, we have the pedestal N encircled by a cam-ring M', having cam-faces $m'$. A plan view of this cam-ring is shown in Fig. 10. These cam-surfaces may be made in any suitable manner to produce any desired results. The crank $k'$ operating the animal is connected with the rod or shaft L, which is moved in guides $l$ and carrying upon its end antifriction-rollers $L^3$, which press against the cam-ring and are adapted to be operated by the cams $m'$. A spring $L^2$ may be employed to keep the wheels $L^3$ against the cam-ring, though this will hardly be necessary in view of the fact that the weight of the animal and its occupant will always tend to keep the parts in operative position. The cam-ring M' may be shifted up or down by means of the device $O^2$ and O', so that the animals may be thrown out of action or into action, as desired. Any other suitable means may be employed for operating the cam-ring. The cam-ring may be permitted to rotate or be held stationary, as in the case of the gear M of Fig. 2.

A' A' indicate toilet-rooms in the rear portion of the building. $A^2$ indicates soda-water fountains or other means of refreshments arranged under the main stairway.

The floor B' and the roof structure adjacent to the pivoted portion of the carousel is supported upon a series of posts K, which thoroughly brace the structure or framing in which the carousel-platforms are pivoted and at the same time act as a strong support to arrest the downward pressure in case any of the ties should break and the platform rest upon the floor B'. These posts K are arranged close to the opening C.

I do not limit myself to the details of construction herein set out, as it is quite evident that they may be modified or varied in numerous ways without departing from the principles of my invention.

Having now described my invention, what I claim as new, and desire to secure by Letters Patent, is—

1. In a carousel, the combination of the main structure having two stationary floors and a central pivot, with two pivoted platforms supported respectively at or about the level of the two floors and forming continuations thereof, power mechanism to revolve the two platforms, and a stairway or means of communication between the lower platform and the upper platform movable with the platforms, whereby the riders of the upper platform are hidden from view by the upper floor and said riders may dismount without descending to the lower floor.

2. In a carousel, the combination of the main structure having two stationary floors with two pivoted platforms supported respectively at or about the level of the two floors and forming continuations thereof, power mechanism to revolve the two platforms, moving figures upon at least one of said platforms, and power devices arranged close to the central axis for operating the said moving figures.

3. The combination of a structure or framing having two stationary floors and an opening between the floors of less diameter than the upper platform, two circular or polygonal pivoted platforms respectively arranged close to the floors and the upper one extending somewhat over the opening between the floors and provided with suitable supports for the riders, and power mechanism for rotating said pivoted platforms, whereby the riders upon the upper platform are hidden from the lower floor and may quickly dismount.

4. The combination of a structure having two floors the upper of which is formed with an opening, a central post pivoted in said structure and extending up through the opening and having a platform adapted to fill the opening in the upper floor and provided with supports for the riders, and power mechanism to rotate said central post and its platform.

5. The combination of a structure having two floors the upper of which is formed with an opening, a central post pivoted in said structure and extending up through the opening and having a platform adapted to fill the opening in the upper floor and provided with supports for the riders, a lower support for riders arranged near the lower floor and suspended from the upper platform, and power mechanism to rotate said central post and its platform.

6. The combination of two circular or polygonal platforms arranged at different levels, a pivoted support therefor, tie-rods for supporting the platforms from the pivoted support, power mechanism to revolve the platforms, and a framework provided with stationary floors substantially at the outer portions or perimeters and at the level of the two platforms and forming continuations thereof.

7. In a carousel, the combination of a stationary building or framework having an elevated floor with a large circular or approximately circular opening therein, a revolving pivoted platform suspended on or about the level of said elevated floor and adapted to be rotated about a vertical axis, and a lower platform suspended below the elevated platform by suspension devices and rotated therewith whereby the lower platform is at a considerably lower elevation than the upper platform and stationary floor.

8. The combination of a rotating platform provided with a series of animals or supports for the riders, suitable back-rests independent of the animals or supports substantially as set out arranged near the periphery and between the periphery of the platform and animals or supports for the riders to lean against when standing on the platform near and facing its periphery, and power mechanism for rotating the platform.

9. In a carousel, the combination of a lower stationary platform, an upper stationary platform having a circular opening of slightly less diameter than the diameter of the rotating platforms, two revolving platforms of substantially the same diameter one arranged above and close to each of the stationary platforms, tie-rods extending down from the upper revolving platform to the lower revolving platform to sustain it and moving within the space formed by the circular opening in the upper stationary platform, a central pivot at a higher elevation than both platforms, and tie-rods connecting the upper revolving platform with the central pivot.

10. The combination of a framework, a pivoted rotating platform having supports for the riders, power mechanism to rotate the said platform, a light, a reflector for said light, varied-colored screens or glasses sustained by the framework for changing the colors of the light and reflecting it upon the riders on the platform, and automatic devices controlled by the rotating platform or its power devices for changing the screens or glasses to project different-colored lights upon the riders while being carried around by the platform.

11. The combination of a frame, a pivoted rotating platform and supports for the riders pivoted in said frame, power mechanism for revolving the said platform, a series of lamps or lights R, a reflector $r$ arranged upon the framework in a fixed position to reflect the light upon the riders while being moved by the platform, a movable frame inclosing the said lights and reflector, a series of different-colored glasses arranged about the periphery of said frame, and means controlled by the rotating platform to intermittently rotate the said frame and colored glasses so as to project upon the riders varied-colored beams of light.

12. The combination of a frame, a pivoted platform and supports for the riders pivoted in said frame, power mechanism for revolving the said platform, a series of lamps or lights R and a reflector r arranged upon the framework in a fixed position to reflect the light upon the riders on the platform, a movable frame inclosing the said lights and reflector, a series of different-colored glasses arranged about the periphery of same frame, and means consisting of lever and ratchet mechanism and a cam secured to the platform to intermittently move the said frame and colored glasses so as to project upon the riders varied-colored beams of light.

13. The combination of a frame, a pivoted platform having supports for riders, power mechanism for rotating said platform, mirrors supported above the riders toward the inner part of the platform, fixed devices for projecting varied-colored lights simultaneously upon said mirrors and riders carried by the platform whereby the revolving mirrors cause the said lights to be projected in all directions upon the riders and connecting devices whereby the devices for projecting varied-colored lights are operated from the same power mechanism which rotates the revolving mirrors and platform.

14. The combination of a frame, a pivoted platform having supports for riders, power mechanism for rotating said platform, mirrors supported above the riders and toward the inner part of the platform, fixed devices for projecting varied-colored lights simultaneously upon said mirrors and riders carried by the revolving platform whereby the revolving mirrors cause the said lights to be projected in all directions upon the riders, and means operated by the rotating platform or its power devices for automatically operating said varied-colored-light devices to change the colors of the lights with the travel of the platform in a predetermined manner.

15. The combination of a central post, a platform carried thereby, moving objects pivoted or supported thereon, power mechanism for rotating the said platform or post, and power devices for operating the objects extending from the said objects to or near the pivot-point of the post and platform consisting of a shaft carried by the platform, a connection between the said shaft and the moving objects, a stationary part arranged adjacent to the pivot of the post, a moving connection between the said stationary part and the shaft, and clutch devices for holding the said stationary part stationary or permitting it to move with the platform as desired.

16. The combination of a revolving platform having a central pivot, power mechanism to revolve the platform, moving objects or supports for the riders, a shaft for operating the moving objects or supports extending therefrom to or near the pivot of the platform, power devices arranged adjacent to the said pivot for operating the said shaft consisting of a stationary part in contact with which the end of the shaft or a part secured thereto is made to engage, whereby great speed may be obtained in the platform and the objects or supports be made to move with a minimum amount of friction, and means to hold the said stationary part against movement or permit it to be moved for the purpose of operating the animals or supports or permitting them to remain at rest.

17. A revolving platform, in combination with power mechanism to revolve it, movable supports for the riders carried upon said platform, and movable shafts arranged upon the under side of the platform and mechanically connected at one end with the movable supports for the riders so as to impart motion thereto and the other end with variable-power mechanism arranged adjacent to the pivot of the platform for putting the supports into or out of motion.

18. A revolving platform, in combination with power mechanism to revolve it, movable supports for the riders carried upon said platform, movable shafts arranged upon the under side of the platform and mechanically connected at one end with the movable supports for the riders so as to impart motion thereto and the other end with power mechanism arranged adjacent to the pivot of the platform consisting of a stationary gear-wheel and pinions arranged upon the end of the movable shafts, and hand-controlled devices for producing a variable motion by the gearing.

19. A revolving platform, in combination with power mechanism to revolve it, movable supports for the riders carried upon said platform, movable shafts arranged upon the under side of the platform and mechanically connected at one end with the movable supports for the riders so as to impart motion thereto and the other end with power mechanism arranged adjacent to the pivot of the platform consisting of a stationary gear-wheel and pinions arranged upon the end of the movable shafts, and means to hold the stationary gear-wheel in a fixed position or permit it to be carried around with the revolving platform.

20. The combination of a pivoted platform, a movable support for the rider arranged near its periphery, power mechanism to revolve the platform, a movable shaft carried by the platform upon its under side, a mechanical connection between the shaft and the movable support for the rider, power mechanism arranged near the pivot of the platform for operating the shaft, and means substantially as set out for throwing the power mechanism into or out of action independently of the power mechanism for rotating the platform.

21. In a carousel, the combination of a rotating platform, vertical suspending tie-rods therefor, a series of animals arranged upon the platform at a distance from the periphery, and a series of back-supports arranged upon the platform between the periphery thereof and the animals and formed of horizontal curved supports separated at intervals to form passages and arranged to correspond to the curve of the periphery of the platform.

In testimony of which invention I have hereunto set my hand.

R. M. HUNTER.

Witnesses:
ERNEST HOWARD HUNTER,
C. M. DIETTERICH.